（12） United States Patent
Tajiri et al.

(10) Patent No.: US 7,961,074 B2
(45) Date of Patent: Jun. 14, 2011

(54) LOAD CELL

(75) Inventors: Shoko Tajiri, Shiga (JP); Shinji Takeichi, Shiga (JP); Hiroki Fujioka, Shiga (JP); Kazuteru Oda, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 498 days.

(21) Appl. No.: 12/095,180

(22) PCT Filed: Jan. 28, 2008

(86) PCT No.: PCT/JP2008/000096
§ 371 (c)(1),
(2), (4) Date: May 28, 2008

(87) PCT Pub. No.: WO2008/099577
PCT Pub. Date: Aug. 21, 2008

(65) Prior Publication Data
US 2010/0148916 A1    Jun. 17, 2010

(30) Foreign Application Priority Data
Feb. 2, 2007  (JP) .................................. 2007-023643

(51) Int. Cl.
*G01L 1/22*    (2006.01)

(52) U.S. Cl. .................... 338/2; 73/862.474; 73/862.625

(58) Field of Classification Search .................. 338/2, 3; 73/781, 862.474, 862.625, 862.627, 862.632; 29/621.1, 621, 620
See application file for complete search history.

(56) References Cited

U.S. PATENT DOCUMENTS

| 4,939,496 | A |   | 7/1990  | Destannes |
|-----------|---|---|---------|-----------|
| 4,951,027 | A |   | 8/1990  | Kitagawa et al. |
| 5,306,873 | A | * | 4/1994  | Suzuki et al. .................. 174/250 |
| 6,694,829 | B2 | * | 2/2004 | Chimura et al. .......... 73/862.627 |
| 6,810,753 | B2 | * | 11/2004 | Valdevit et al. .......... 73/862.045 |
| 2005/0211003 | A1 | * | 9/2005 | Yoshikuwa .............. 73/862.474 |

FOREIGN PATENT DOCUMENTS

| JP | S61-096421 A | 5/1986 |
|----|--------------|--------|
| JP | S63-079027 A | 4/1988 |
| JP | H01-132902 A | 5/1989 |
| JP | H05-081672 U | 11/1993 |
| JP | H11-064125 A | 3/1999 |

* cited by examiner

*Primary Examiner* — Kyung Lee
(74) *Attorney, Agent, or Firm* — Global IP Counselors, LLP

(57) ABSTRACT

The load cell includes a strain generating body having a strain generated portion, and a strain detection element provided on a surface of the strain generating body in a portion corresponding to the strain generated portion and having an inversion portion and a straight portion. A creep characteristic is adjusted by a thickness of the strain generated portion in a portion corresponding to the inversion portion.

7 Claims, 7 Drawing Sheets

[FIG. 1]
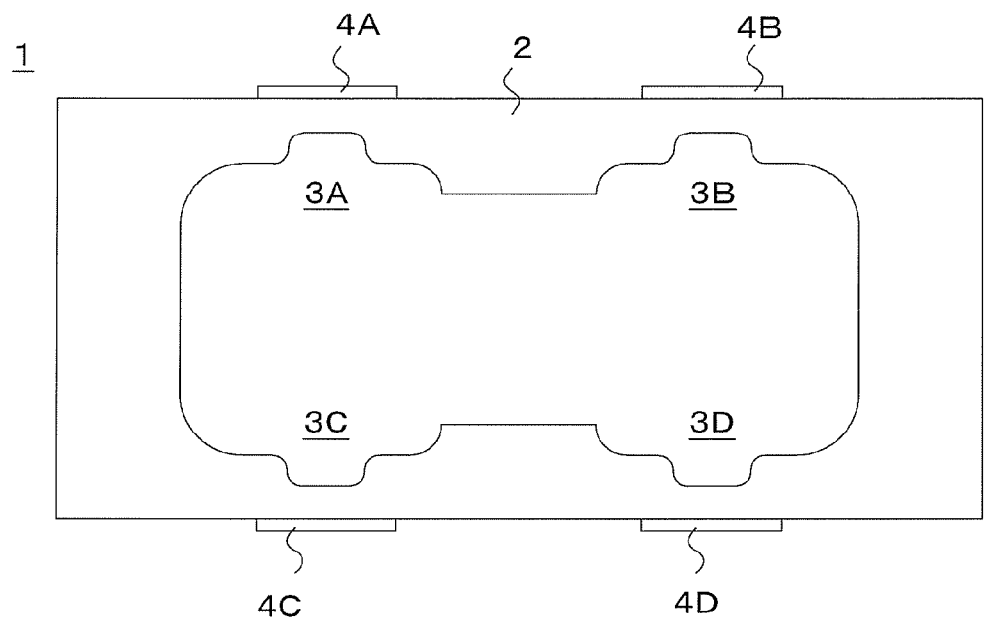
[FIG. 2]
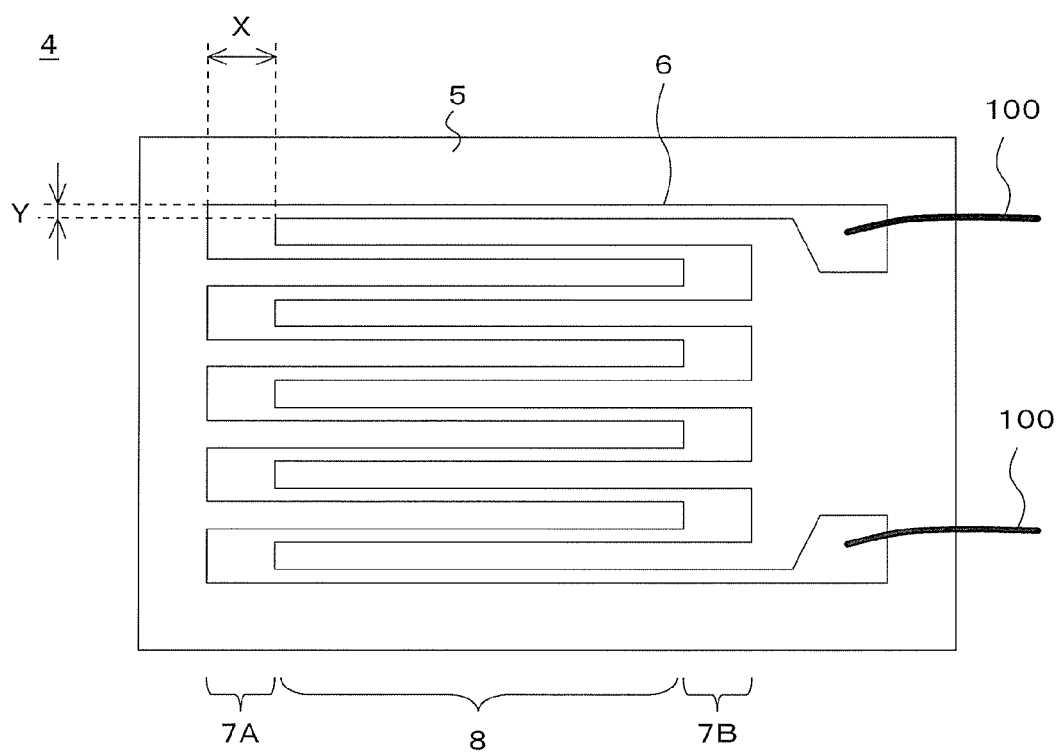

[FIG. 3]
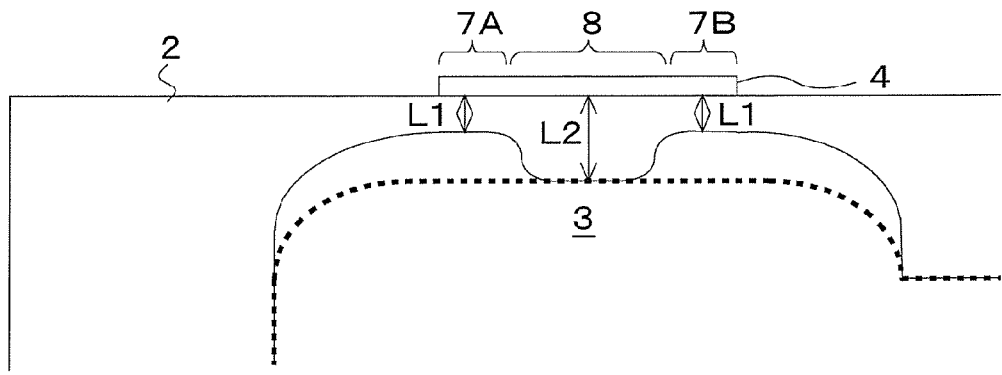
[FIG. 4]
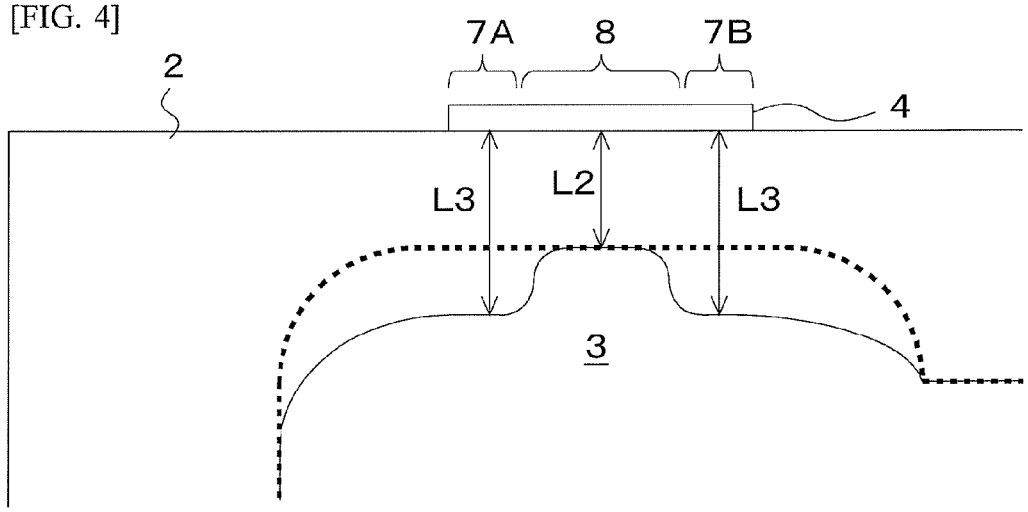
[FIG. 5]
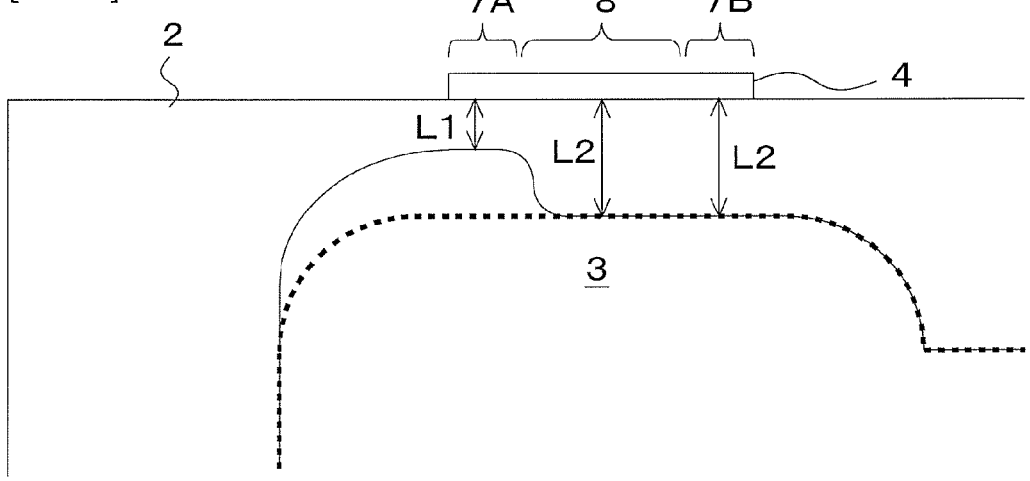

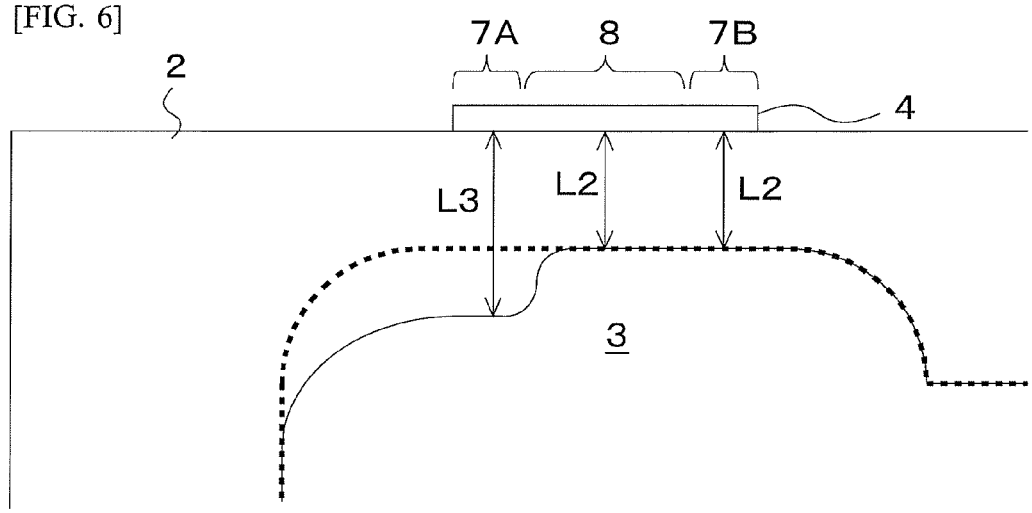
[FIG. 6]
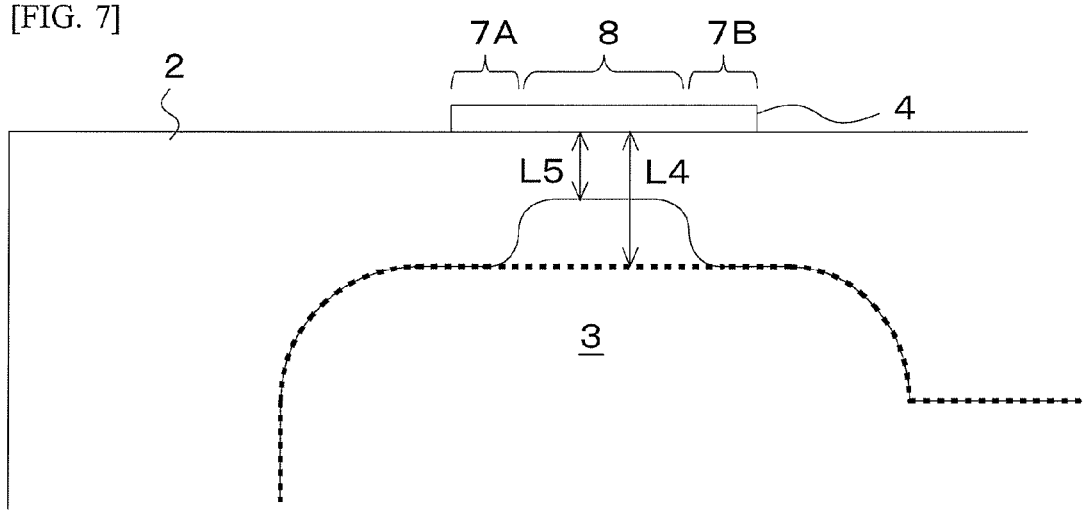
[FIG. 7]
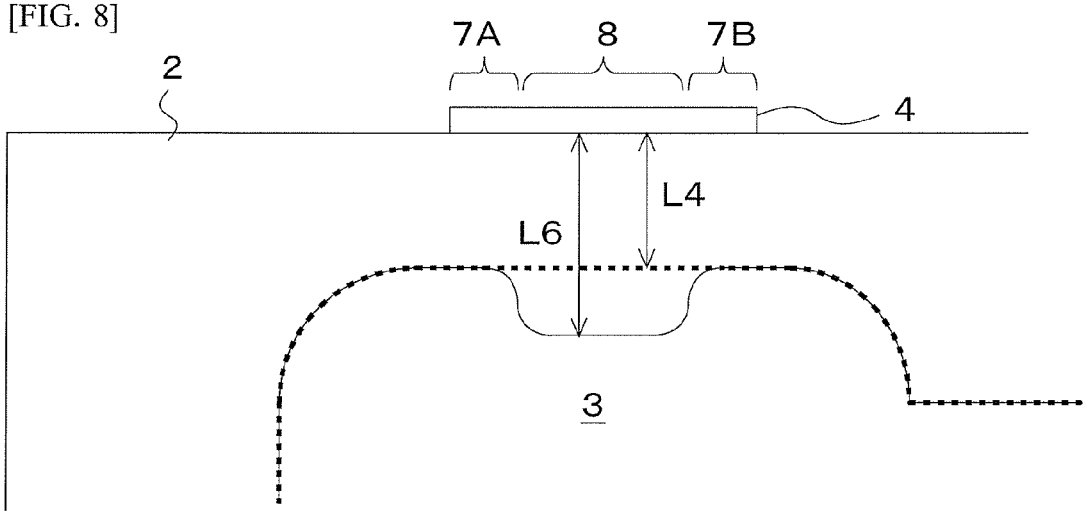
[FIG. 8]

[FIG. 9]
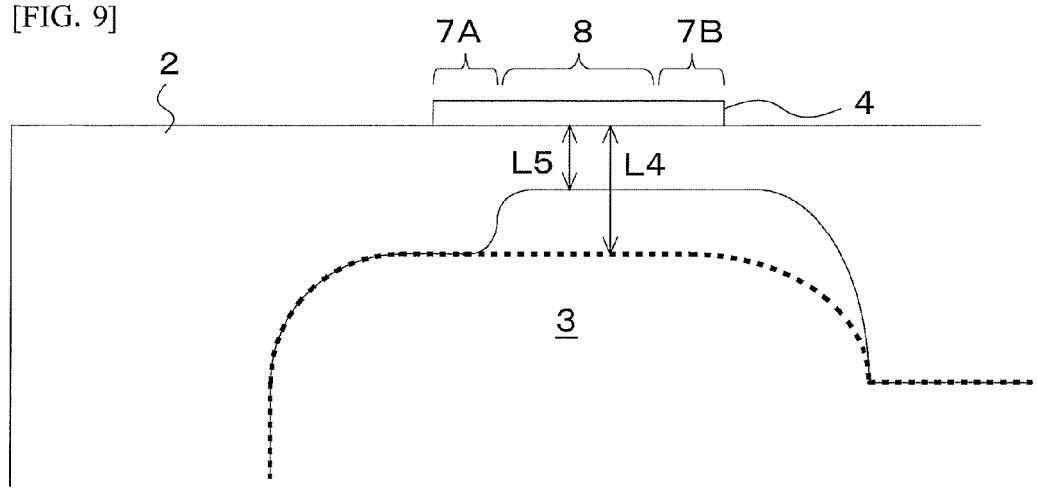
[FIG. 10]
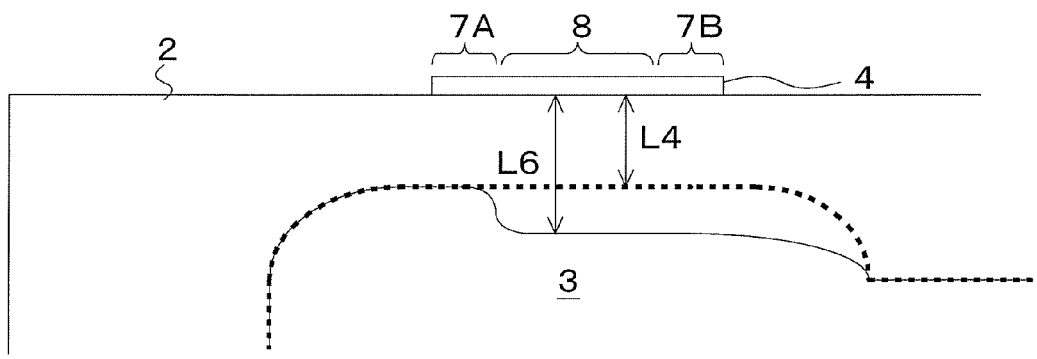
[FIG. 11]
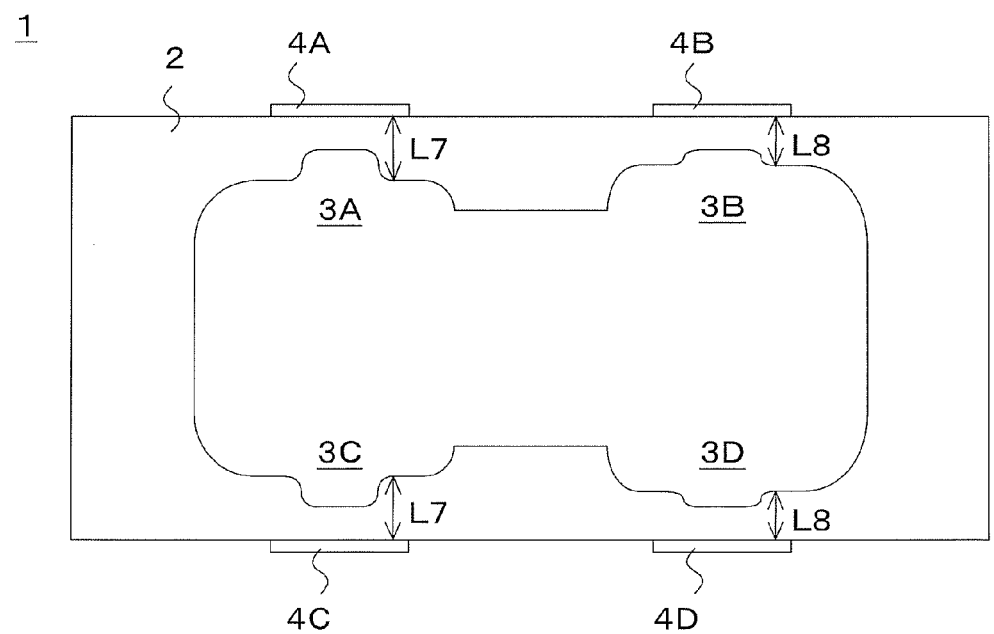

[FIG. 12]
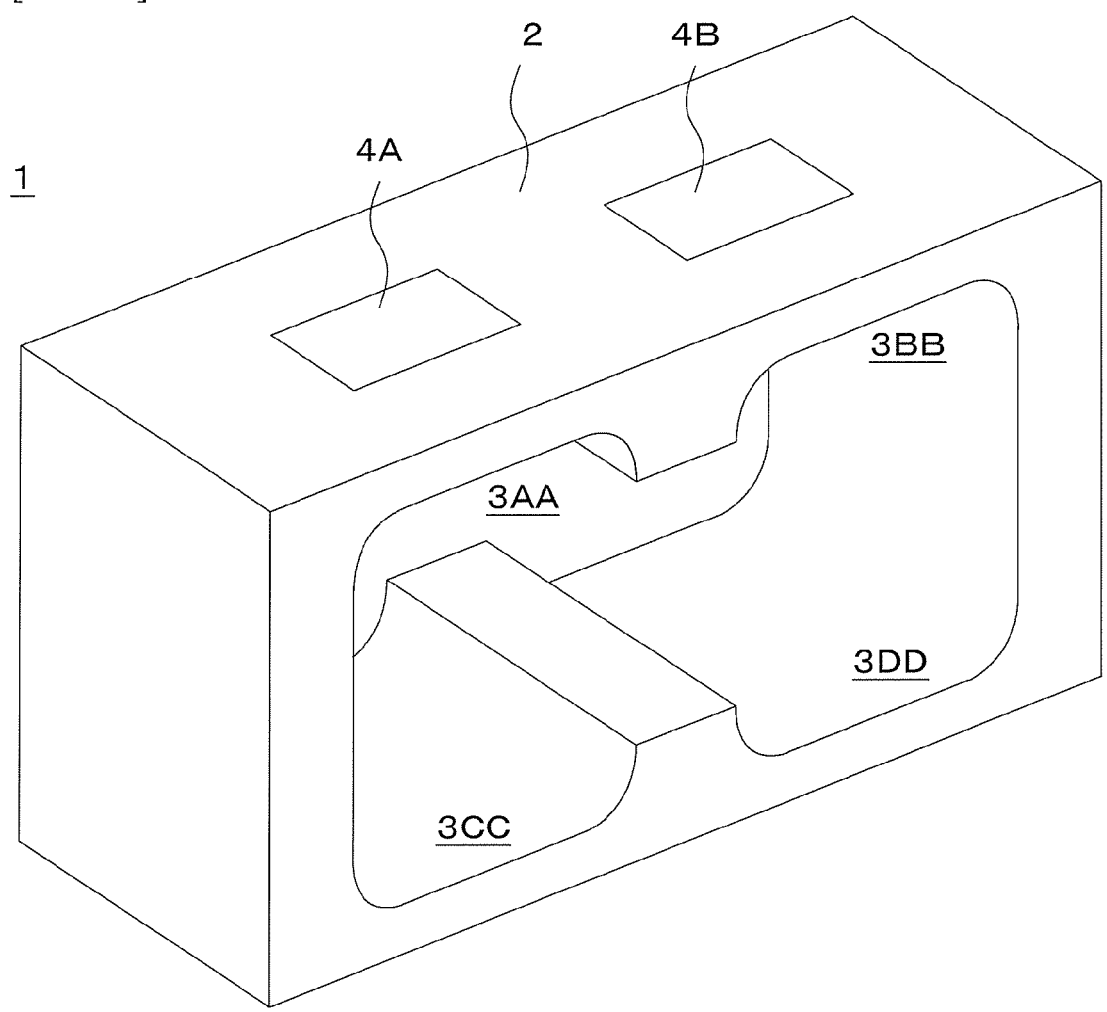

[FIG. 13]
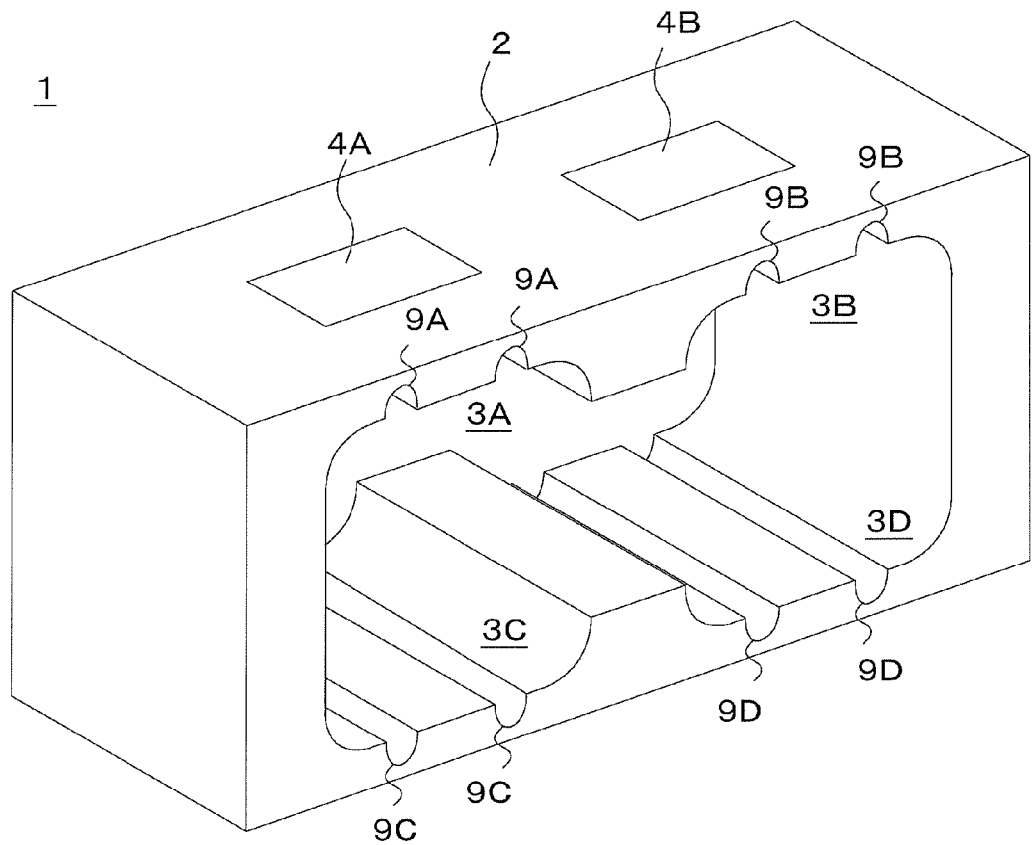
[FIG. 14]
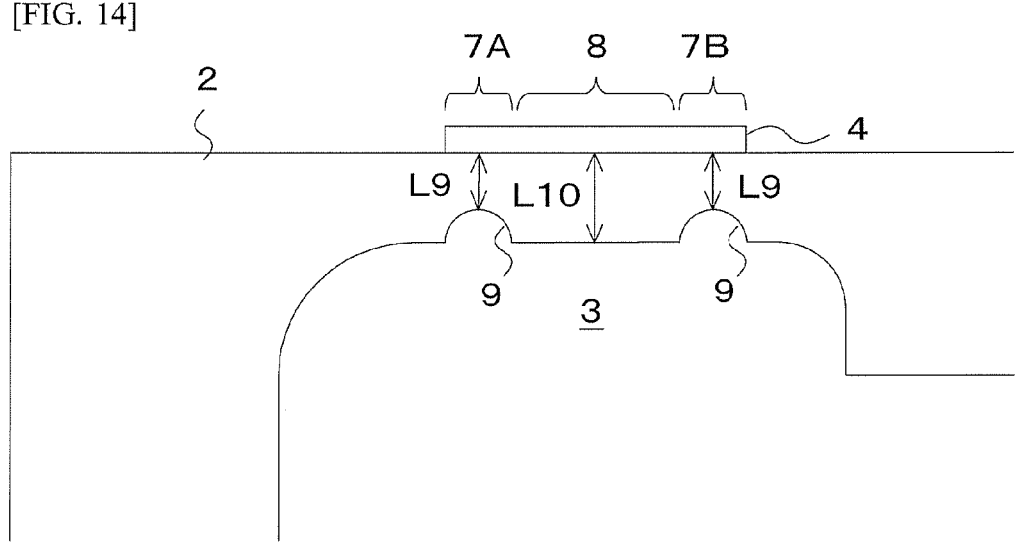

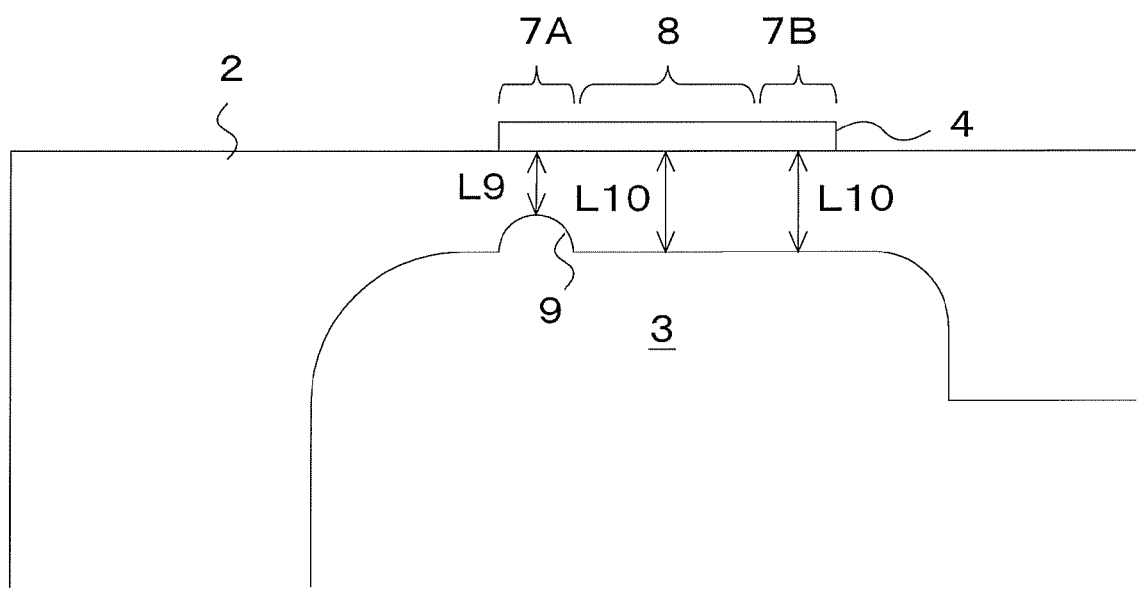
[FIG. 15]

LOAD CELL

CROSS-REFERENCE TO RELATED APPLICATIONS

This U.S. national phase application claims priority to Japanese Patent Application No. 2007-023643 filed on Feb. 2, 2007. The entire disclosure of Japanese Patent Application No. 2007-023643 is hereby incorporated herein by reference.

TECHNICAL FIELD

The present invention relates to a load cell used for an electronic scale or the like, and more specifically, relates to a load cell of a strain gauge type.

BACKGROUND ART

In a conventional load cell of a strain gauge type, adjustment of creep characteristics is realized by changing a tab ratio of a strain gauge.

In case of producing many kinds of load cells, such load cells are produced that creep characteristics thereof are adjusted by using strain gauges having different tab ratios for each kind of load cells or each rated load (for example, see Japanese Patent Application Publication No. H11-64125).

DISCLOSURE OF INVENTION

In the above conventional load cell of a strain gauge type, the following problems arise. That is, since types of strain gauges are generally limited, values of the tab ratio of each type of strain gauge on sale are not successive (i.e. discrete). Moreover, due to the design limitation of a circuit pattern of a strain gauge, a value of a tab ratio is limited to a certain range. Therefore, in case of adjusting creep characteristics by changing a tab ratio, an amount of adjustment and an available range of adjustment are limited.

Furthermore, since it is required to prepare plural kinds of strain gauges having different tab ratios in advance, control over a huge stock is troublesome.

The present invention has been made in view of such situation, and is directed to obtaining a load cell capable of adjusting creep characteristics in a measure except for changing a tab ratio. Furthermore, the present invention is directed to obtaining a load cell whose creep characteristic is properly adjusted, while using a single kind of strain gauge having a fixed tab ratio.

A load cell according to a first aspect of the invention includes a strain generating body having a strain generated portion and a strain detection element provided on a surface of the strain generating body in a portion corresponding to the strain generated portion and having an inversion portion and a straight portion. The strain generated portion has a first prescribed thickness in a portion corresponding to the inversion portion of the strain detection element to adjust a creep characteristic of the load cell.

A load cell according a second aspect of the invention is the load cell according to the first aspect of the invention, wherein the strain generated portion has a second prescribed thickness in a portion corresponding to the straight portion of the strain detection element to adjust a level of an output value of the load cell.

A load cell according to a third aspect of the invention is the load cell according to the first aspect of the invention, wherein the strain generated portion has a second prescribed thickness in a portion corresponding to the straight portion of the strain detection element with the second prescribed thickness being different from the first prescribed thickness.

A load cell according to a fourth aspect of the invention is the load cell according to the first aspect of the invention, wherein the strain detection element further includes an additional inversion portion with the straight portion interposed between the inversion portion and the additional inversion portion, and the strain generated portion has the first prescribed thickness for adjusting the creep characteristic only in the portion corresponding to the inversion portion among the inversion potion and the additional inversion portion of the strain detection element.

A load cell according to a fifth aspect of the invention is the load cell according the first aspect of the invention, wherein the strain generating body further includes an additional strain generated portion with an additional strain detection element being provided on a surface of the strain generating body in a portion corresponding to the additional strain generated portion, and the additional strain generated portion has a prescribed thickness, which is different from the first prescribed thickness, in a portion corresponding to an inversion portion of the additional strain detection element.

A load cell according to a sixth aspect of the invention is the load cell according to the first aspect of the invention, wherein the strain generated portion includes a recess portion formed on an inner surface of the strain generated portion in the portion corresponding to the inversion portion to achieve the first prescribed thickness.

A load cell according to a seventh aspect of the invention is the load cell according to the sixth aspect of the invention, wherein the recess portion of the strain generated portion has a shape that is symmetrical in a board thickness direction of the strain generating body.

In the load cell according to the first aspect of the invention, a creep characteristic is adjusted by a thickness of the strain generated portion in a portion corresponding to the inversion portion, rather than by a tab ratio of the strain detection element. Thus, a load cell whose creep characteristic is adjusted with high precision without design limitation of the strain detection element can be obtained. Moreover, a load cell whose creep characteristic is properly adjusted while using a single kind of strain gauge without necessity to prepare plural kinds of strain gauges having different tab ratios for each kind of the load cell or for each rated load in advance can be obtained.

In the load cell according to the second aspect of the invention, an output value of the load cell can be adjusted to a proper level by adjusting the thickness of the strain generated portion in a portion corresponding to the straight portion in accordance with a rated load of the load cell.

In the load cell according to the third aspect of the invention, a thickness of the strain generated portion is different between the portion corresponding to the inversion portion and the portion corresponding to the straight portion. Thus, adjustment of the creep characteristic based on the thickness in the portion corresponding to the inversion portion and adjustment of the level of an output value of the load cell based on the thickness in the portion corresponding to the straight portion can be performed independently. Thereby, adjustment of the creep characteristic is achieved without changing the level of an output value of the load cell.

In the load cell according to the fourth aspect of the invention, thickness adjustment in the portion corresponding to the straight portion is easier, compared to thickness adjustment in the portions corresponding to both of the two inversion portions for adjustment of the creep characteristic. Thus, reliable adjustment of the level of an output value of the load cell is achieved even in a case of a small strain detection element.

In the load cell according to the fifth aspect of the invention, among the plurality of strain generated portions provided in the strain generating body, by having different thickness in the portion corresponding to the inversion portion for each strain generated portion, not only separate adjustment of the creep characteristic of each strain generated portion, but also adjustment of the creep characteristic of a whole load cell in light of a balance among the plurality of strain generated portions is achieved.

In the load cell according to the sixth aspect of the invention, a recess portion is made on an inner surface of the strain generated portion, thereby adjusting the thickness of the strain generated portion in a portion corresponding to the inversion portion. Thus, by making a recess portion after forming a load cell, adjustment of creep characteristics after forming a load cell is achieved.

In the load cell according to the seventh aspect of the invention, a recess portion is made so as to be symmetrical about a board thickness direction of the strain generating body. Hence, unlike a cut or recess portion for correcting a bias placement error, by making recess portion symmetrical about the board thickness direction of the strain generating body, adjustment of the creep characteristic is achieved without making a new asymmetric error.

BRIEF DESCRIPTION OF DRAWINGS

FIG. 1 is a plan view showing a configuration of a load cell according to an embodiment of the present invention.

FIG. 2 is an enlarged plan view showing a configuration of a strain detection element.

FIG. 3 is an enlarged partial plan view showing only one strain generated portion extracted from the load cell shown in FIG. 1.

FIG. 4 is an enlarged partial plan view showing only one strain generated portion of the load cell according to a first modified embodiment.

FIG. 5 is an enlarged partial plan view showing only one strain generated portion according to a second modified embodiment of the load cell shown in FIG. 1.

FIG. 6 is an enlarged partial plan view showing only one strain generated portion according to a third modified embodiment of the load cell shown in FIG. 1.

FIG. 7 is an enlarged partial plan view showing only one strain generated portion according to a fourth modified embodiment of the load cell shown in FIG. 1.

FIG. 8 is an enlarged partial plan view showing only one strain generated portion according to a fifth modified embodiment of the load cell shown in FIG. 1.

FIG. 9 is an enlarged partial plan view showing only one strain generated portion according to a sixth modified embodiment of the load cell shown in FIG. 1.

FIG. 10 is an enlarged partial plan view showing only one strain generated portion according to a seventh modified embodiment of the load cell shown in FIG. 1.

FIG. 11 is a plan view showing another configuration of the load cell according to an embodiment of the present invention.

FIG. 12 is a perspective view showing in a process sequence a method for forming a strain generated portion of another load cell according to an embodiment of the present invention.

FIG. 13 is a perspective view showing in a process sequence a method for forming a strain generated portion of another load cell according to an embodiment of the present invention.

FIG. 14 is an enlarged partial plan view showing only one strain generated portion extracted from the load cell shown in FIG. 13.

FIG. 15 is an enlarged partial plan view showing only one strain generated portion according to a modified embodiment of the load cell shown in FIG. 13.

BEST MODE FOR CARRYING OUT THE INVENTION

Embodiments of the present invention are explained using drawings in detail below. It should be noted that identical reference numerals throughout the drawings indicate identical or equivalent elements.

FIG. 1 is a plan view showing a configuration of a load cell 1 according to an embodiment of the present invention. As shown in FIG. 1, the load cell 1 according to the present embodiment includes a hollow strain generating body 2 provided with a plurality number (four in an example of FIG. 1) of strain generated portions 3A to 3D, and strain detection elements (strain gauges) 4A to 4D respectively provided on a surface (outer surface) of the strain generating body 2 in a portion corresponding to each of the strain generated portions 3A to 3D. The strain detection elements 4A to 4D are connected with each other so as to constitute a Wheatstone bridge circuit. In the explanations below, each of the strain generated portions 3A to 3D is generically referred to as a strain generated portion 3, and each of the strain detection elements 4A to 4D is generically referred to as a strain detection element 4.

FIG. 2 is a plan view showing a configuration of the strain detection element 4. As shown in FIG. 2, the strain detection element 4 is configured such that a conductive circuit pattern 6 is formed in a meander shape on a base member 5. The circuit pattern 6 includes inversion portions (tab portions) 7A and 7B of a meander and a straight portion (a filament portion) 8 connecting each of the inversion portions 7A and 7B. The inversion portion 7A of the inversion portions 7A and 7B is the one that is far from the junction between the circuit pattern 6 and a lead 100, and the inversion portion 7B is the closer one. In the explanations below, the inversion portions 7A and 7B are generically referred to as inversion portion 7. Here, when the dimension of the inversion portion 7 is defined as X, and the width of the straight portion 8 is defined as Y, a value of the tab ratio (=X/Y) is known to affect characteristics of the creep phenomenon (hereinafter referred to as "creep characteristic") of the load cell 1. The creep phenomenon is a phenomenon that an output value of a load cell changes over time from the time loading starts, when a state in which the load cell is loaded with a certain amount of weight is maintained. Generally, when a tab ratio is great, a positive creep characteristic is exhibited. In other words, an output value increases over time.

FIG. 3 is an enlarged partial plan view showing only one strain generated portion 3 extracted from the load cell 1 shown in FIG. 1. As shown in FIG. 3, thickness (distance between an inner surface and an outer surface) of the strain generating body 2 in a strain generated portion 3 is L1 substantially throughout each of portions corresponding to the inversion portions 7A and 7B of the strain detection element 4, and is L2 substantially throughout a portion corresponding to a straight portion 8. A feature of the load cell 1 according to the present embodiment is that creep characteristics of the load cell 1 are adjusted not by a tab ratio of the strain detection element 4, but by the thickness L1 of the strain generated portion 3 in portions corresponding to the inversion portions 7A and 7B. In other words, it is assumed that the level of an output value of the load cell is proper but the output value exhibits a negative creep characteristic, when a certain strain detection element 4 is adopted and a strain generated portion 3 in a normal shape shown by the broken line is formed. In this case, the strain generated portion 3 in a shape shown in FIG. 3 (L1<L2) is formed so as to correct the creep characteristic to a plus direction to approach zero.

In contrast, it is assumed that the level of an output value of the load cell is proper but the output value exhibits a positive creep characteristic, when a certain strain detection element 4 is adopted and a strain generated portion 3 in a normal shape shown by the broken line is formed. In this case, the strain generated portion 3 in a shape shown in FIG. 4 (L3>L2) is formed so as to correct the creep characteristic to a minus direction to approach zero.

FIGS. 3 and 4 show examples of performing thickness adjustment of the strain generating body 2 corresponding to both of the inversion portions 7A and 7B. As shown in FIGS. 5 and 6, however, thickness adjustment of the strain generating body 2 may be performed corresponding to one of the inversion portions 7A and 7B (only the inversion portion 7A in the example in FIGS. 5 and 6). In this case, thickness adjustment of the strain generating body 2 in a portion corresponding to the straight portion 8 is easier, compared to the case where thickness adjustment of the strain generating body 2 is performed corresponding to both of the inversion portions 7A and 7B. Thus, even when the strain detection element 4 is small in size and the straight portion 8 is as short as a few millimeters, reliable adjustment of the level of an output value of the load cell is achieved.

FIG. 7 is an enlarged partial plan view showing only one strain generated portion 3 according to a modified embodiment of the load cell 1 shown in FIG. 1. The broken line in FIG. 7 shows a shape of the strain generated portion 3 in a state where adjustment of creep characteristics has been completed by thickness adjustment in the portions corresponding to the inversion portions 7A and 7B. As shown in FIG. 7, the thickness of the strain generating body 2 in the portion corresponding to the straight portion 8 of the strain detection element 4 is L4. Here, in the load cell 1 according to the present embodiment, adjustment of the level of an output value of the load cell 1 in accordance with rated load by the thickness of the strain generated portion 3 in the portion corresponding to the straight portion 8 is achieved. More specifically, when applied for a load cell which is smaller in rated load than a load cell which is in a shape shown by the broken line in FIG. 7, the thickness of the strain generating body 2 in the portion corresponding to the straight portion 8 is set at L5 (<L4), so that the strain generated portion 3 is formed in a shape shown by the continuous line in FIG. 7.

In contrast, when applied for a load cell which is larger in rated load than a load cell which is in a shape shown by the broken line in FIG. 7, as shown in FIG. 8, the thickness of the strain generating body 2 in the portion corresponding to the straight portion 8 is set at L6 (>L4), so that the strain generated portion 3 is formed in a shape shown by the continuous line in FIG. 8.

Regarding the thickness of the strain generating body 2, the thickness in the portion corresponding to the inversion portion 7A and the thickness in the portion corresponding to the inversion portion 7B may be different from each other, as in the examples shown in FIGS. 5 and 6 (see FIGS. 9 and 10).

Moreover, in the load cell 1 according to the present embodiment, the thickness of the strain generating body 2 in the strain generated portion 3 are different between the portion corresponding to the inversion portion 7 and the portion corresponding to the straight portion 8, as shown in FIGS. 3 to 10. Thus, adjustment of creep characteristics based on the thickness in the portion corresponding to the inversion portion 7 and adjustment of the level of an output value of the load cell based on the thickness in the portion corresponding to the straight portion 8 can be performed independently. This achieves adjustment of only creep characteristics, for example, without changing the level of an output value of the load cell, by having a common thickness in the portion corresponding to the straight portion 8 and having a different thickness only in the portion corresponding to the inversion portion 7.

Furthermore, while FIG. 1 shows an example of the strain generated portions 3A to 3D all having the same structure, the structures of the strain generated portions 3A to 3D do not necessarily have to be the same. FIG. 11 is a plan view showing another configuration of the load cell 1 according to the present embodiment. While the thickness of the strain generating body 2 in the portion corresponding to the inversion portion 7 in the strain generated portions 3A and 3C is L7, the thickness of the strain generating body 2 in the portion corresponding to the inversion portion 7 in the strain generated portions 3B and 3D is L8 (<L7). In this way, at least two kinds of strain generated portions 3 having different thickness in the portion corresponding to the inversion portion 7 may be included. By having different thickness in the portion corresponding to the inversion portion 7 for each strain generated portion 3 among the plurality of strain generated portions 3 provided in the strain generating body 2, not only separate adjustment of creep characteristics of each strain generated portion 3, but also adjustment of creep characteristics of a whole load cell 1 in light of a balance among the plurality of strain generated portions 3 is achieved.

FIGS. 12 and 13 are perspective views showing in a process sequence a method for forming a strain generated portion 3 of another load cell 1 according to the present embodiment, and FIG. 14 is a plan view showing only one strain generated portion 3 extracted from the load cell 1 shown in FIG. 13. FIG. 12 shows the load cell 1 with the strain detection element 4 being attached to the strain generating body 2 having strain generated portions 3AA to 3DD formed therein. In the strain generated portions 3AA to 3DD, the thickness of the staring generating body 2 (corresponding to L10 in FIG. 14) is the same between the portion corresponding to the inversion portion 7 of the strain detection element 4 and the portion corresponding to the strait portion 8. The thickness, however, may be different between those at this time.

Next, referring to FIG. 13, cuts or recess portions 9A to 9D are formed by partially cutting the inner surface of the strain generating body 2 in the strain generated portions 3AA to 3DD from the state shown in FIG. 12. Thereby, strain generated portions 3A to 3D are formed. In the explanations below, the cuts 9A to 9D are generically referred to as cut 9. As shown in FIG. 14, the cut 9 is formed in the portion corresponding to the inversion portion 7 of the strain detection element 4. A thickness L9 of the strain generated portion 3 in the portion corresponding to the inversion portion 7 is adjusted depending on a depth of the cut 9. In other words, creep characteristics are adjusted.

In the load cell 1 shown in FIGS. 12 and 13, the thickness L9 of the strain generated portion 3 in the portion corresponding to the inversion portion 7 is adjusted by having the cut 9 made on the inner surface of the strain generated portion 3. Thus, by making the cut 9 after forming the load cell 1 shown in FIG. 12, adjustment of creep characteristics after forming the load cell 1 is achieved. Consequently, enhancement in precision by modifying variation among products and improvement in yield factor by mending defective units can be expected.

Here, in the example shown in FIG. 13, the cut 9 (recess portion) is formed in a way to penetrate the strain generating body 2 in a board thickness direction of the strain generating body 2. The cut 9, however, is not limited to this example but only needs to be made so as to be symmetrical about the board thickness direction (i.e., the direction parallel to the inner and outer surfaces of the strain generating body 2) of the strain generating body 2, for example, to be made only in the both edge portions or only in the center portion in the board thickness direction of the strain generating body 2. By making cuts 9 symmetrical about the board thickness direction of the strain generating body 2, adjustment of creep characteristics is achieved without making a new asymmetric error, unlike a cut for correcting a bias placement error.

Moreover, while FIG. 14 shows an example of making the cuts 9 corresponding to both inversion portions 7A and 7B, as shown in FIG. 15, the cut 9 may be made corresponding to only one of the inversion portions 7A and 7B (inversion portion 7A in the example show in FIG. 15).

In this way, in the load cell 1 according to the present embodiment, creep characteristics are adjusted by a thickness of the strain generated portion 3 in a portion corresponding to the inversion portion 7, rather than a tab ratio of the strain detection element 4. Thus, a load cell whose creep characteristic is adjusted with high precision can be obtained without design limitation of the strain detection element 4 (or the circuit pattern 6). Moreover, a load cell whose creep characteristic is adjusted can be obtained, using a single kind of strain detection element 4 without necessity to prepare plural kinds of strain detection elements 4 having different tab ratios for each kind of the load cell 1 or for each rated load in advance.

The invention claimed is:

1. A load cell comprising:
a strain generating body having a strain generated portion; and
a strain detection element provided on a surface of the strain generating body in a portion corresponding to the strain generated portion and having an inversion portion and a straight portion,
the strain generated portion having a first prescribed thickness substantially throughout a portion corresponding to the inversion portion of the strain detection element to adjust a creep characteristic of the load cell, and a second prescribed thickness substantially throughout a portion corresponding to the straight portion of the strain detection element with the second prescribed thickness being different from the first prescribed thickness.

2. The load cell according to claim 1, wherein
the second prescribed thickness is set to adjust a level of an output value of the load cell.

3. A load cell comprising:
a strain generating body having a strain generated portion; and
a strain detection element provided on a surface of the strain generating body in a portion corresponding to the strain generated portion and having an inversion portion and a straight portion,
the strain generated portion having a first prescribed thickness in a portion corresponding to the inversion portion of the strain detection element to adjust a creep characteristic of the load cell,
the strain detection element further including an additional inversion portion with the straight portion interposed between the inversion portion and the additional inversion portion, and
the strain generated portion having the first prescribed thickness for adjusting the creep characteristic only in the portion corresponding to the inversion portion among the inversion portion and the additional inversion portion of the strain detection element.

4. The load cell according to claim 3, wherein
the strain generated portion has a second prescribed thickness in a portion corresponding to the straight portion and a portion corresponding to the additional inversion portion of the strain detection element with the second prescribed thickness being different from the first prescribed thickness.

5. A load cell comprising:
a strain generating body having a strain generated portion; and
a strain detection element provided on a surface of the strain generating body in a portion corresponding to the strain generated portion and having an inversion portion and a straight portion,
the strain generated portion having a first prescribed thickness in a portion corresponding to the inversion portion of the strain detection element to adjust a creep characteristic of the load cell,
the strain generating body further including an additional strain generated portion with an additional strain detection element being provided on a surface of the strain generating body in a portion corresponding to the additional strain generated portion, and
the additional strain generated portion having a prescribed thickness, which is different from the first prescribed thickness, in a portion corresponding to an inversion portion of the additional strain detection element.

6. A load cell comprising:
a strain generating body having a strain generated portion; and
a strain detection element provided on a surface of the strain generating body in a portion corresponding to the strain generated portion and having an inversion portion and a straight portion,
the strain generated portion having a first prescribed thickness in a portion corresponding to the inversion portion of the strain detection element to adjust a creep characteristic of the load cell,
the strain generated portion including a recess portion formed on an inner surface of the strain generated portion in the portion corresponding to the inversion portion to achieve the first prescribed thickness.

7. The load cell according to claim 6, wherein
the recess portion of the strain generated portion has a shape that is symmetrical in a board thickness direction of the strain generating body.

* * * * *